US012375141B2

(12) United States Patent
Kanzal Venkatesha et al.

(10) Patent No.: US 12,375,141 B2
(45) Date of Patent: Jul. 29, 2025

(54) SYSTEM AND METHOD FOR POWER SAVING IN AN ORAN WITH INTELLIGENT BEAMFORMING WEIGHTS

(71) Applicant: Rakuten Symphony, Inc., Tokyo (JP)

(72) Inventors: Hari Swaroop Kanzal Venkatesha, Bangalore (IN); Ronak Bharatkumar Lalwala, Bangalore (IN); Siddhant Gupta, Bangalore (IN); Rajesh Teli, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/025,416

(22) PCT Filed: Dec. 28, 2022

(86) PCT No.: PCT/US2022/054116
§ 371 (c)(1),
(2) Date: Mar. 9, 2023

(87) PCT Pub. No.: WO2024/144767
PCT Pub. Date: Jul. 4, 2024

(65) Prior Publication Data
US 2024/0333351 A1    Oct. 3, 2024

(51) Int. Cl.
*H04B 7/02*      (2018.01)
*H04B 7/0456*    (2017.01)
*H04B 7/06*      (2006.01)

(52) U.S. Cl.
CPC ......... *H04B 7/0617* (2013.01); *H04B 7/0456* (2013.01)

(58) Field of Classification Search
CPC .............................. H04B 7/0617; H04B 7/0456
USPC ................ 375/267, 262, 259, 219, 295, 316
See application file for complete search history.

(56) References Cited

U.S. PATENT DOCUMENTS

| 2022/0321178 A1* | 10/2022 | Maleki | H04L 1/0036 |
| 2022/0407573 A1* | 12/2022 | Dou | H04W 72/566 |
| 2024/0235648 A1* | 7/2024 | Ikami | H04B 7/0691 |

\* cited by examiner

*Primary Examiner* — Zewdu A Kassa
(74) *Attorney, Agent, or Firm* — Sughrue Mion, PLLC

(57) ABSTRACT

Techniques for reducing power consumption in a radio unit are disclosed. The techniques include determining a number of Multiple-Input-Multiple-Output (MIMO) antenna elements of a MIMO antenna panel required to serve one or more User Equipment (UEs), identifying a number of MIMO antenna elements of the MIMO antenna panel not needed to serve the UEs. The techniques include sending, from an Open Radio Network (O-RAN) Distributed Unit (O-DU) to a O-RAN Radio Unit (O-RU), a beamforming weight of zero assigned to the MIMO antenna elements identified as not needed to serve the one or more UEs, the beamforming weight being sent in a digital domain via a Control plane (C-plane). The MIMO antenna elements assigned the beamforming weight of zero may be disabled thereby reducing the power consumption of the O-RU. Artificial Intelligence algorithms may be implemented to dynamically determine areas where the O-RAN should have more coverage or less coverage.

19 Claims, 5 Drawing Sheets

SYSTEM AND METHOD FOR POWER SAVING IN AN ORAN WITH INTELLIGENT BEAMFORMING WEIGHTS

CROSS-REFERENCE TO RELATED APPLICATION

This application is a national stage application of International Application No. PCT/US2022/054116, filed on Dec. 28, 2022, and designated the U.S., the entire contents of which are herein wholly incorporated by reference.

TECHNICAL FIELD

The disclosure is related to Open Radio Access Network (O-RAN) wireless communication systems and reducing radio power consumption in the O-RAN using beamforming weights.

BACKGROUND

Generally, a wireless communication system includes a Radio Access Network (RAN) and a Core Network (CN). The RAN implements a Radio Access Technology (RAT) that resides between an end user device, often referred to as user equipment (UE) devices such as cell phones, tablet computers, laptop computers, embedded wireless modules, and other wirelessly equipped devices, whether or not user operated, and the CN. The RAN includes a combination of network elements that connect the end user (UE) to the CN. Traditionally, the hardware and software elements of a given RAN are vendor specific. O-RAN technology has emerged to enable an open RAN architecture.

An O-RAN architecture is intended to improve competition, network flexibility, and cost. A primary goal of O-RAN is to create an multi-vendor solution that separates or disaggregates the RAN functions between hardware and software platforms with an open interfaces and virtualization.

Mobile or UE traffic growth is driven by the rising number of smartphone subscriptions and an increasing average data volume per subscription leading to increasingly dense network deployments. 5G New Radio (NR) is designed to enable denser network deployments and deliver increased energy efficiency. The continued exponential growth in data traffic has expanded mobile networks. This expansion has led to the energy consumption in radio networks becoming a significant contributor to the electricity usage and operational expenditures for operators.

A 2018 study estimates that the information and communications technology (ICT) sector's carbon footprint to be about 1.4% of overall global emissions. Further studies estimate that the ICT sector currently accounts for 5%-9% of total electricity grid supply globally. In addition, these studies estimate that the ICT sector will consume between 10%-20% of total electricity grid supply globally by 2030.

With new devices and use cases increasing the capacity of the networks, the demand to ensure low 5G energy consumption is critical to minimizing operator expenses and ensuring they can still meet energy reduction goals.

A major part of energy consumption in mobile networks is from base station sites. Consequently, energy consumption at the base station is growing at a fast rate. Thus, network operators have to balance pursuing high capacity, spectral efficiency and the energy efficient design of their networks.

Even in densely deployed networks, such as in city centers, the network traffic load can fluctuate greatly during the day, with significant periods of almost no traffic in the base stations. When further examining the traffic patterns, it can be seen see that there are many short gaps in the data transmissions even during highly loaded periods. Looking at base station power consumption characteristics, it can be seen that there is significant energy consumption at the base station even at times when the base station is idle. That is, even at times when there is low or no output power.

In 5G NR, the O-RAN disaggregates RAN functions into a Centralized Unit (O-CU), a Distributed Unit (O-DU), and a Radio Unit (O-RU). The O-RU may also be referred to as a Remote Radio Unit (RRU). Power consumption in the O-RU is predominantly from the Power Amplifier (PA). The ability to dynamically control the PAs in the O-RU would provide a significant energy savings in a wireless communications or mobile network. Thus, the need exist for a solution to dynamically control the PAs in the O-RU.

SUMMARY

In one general aspect, a method may include determining a number of Multiple-Input-Multiple-Output (MIMO) antenna elements of a MIMO antenna panel required to serve one or more User Equipment (UEs). The method may also include identifying a number of MIMO antenna elements of the MIMO antenna panel not necessary to serve the one or more UEs. The method may furthermore include sending, from an Open Radio Network (O-RAN) Distributed Unit (O-DU) to a O-RAN Radio Unit (O-RU), a beamforming weight of zero assigned to the MIMO antenna elements identified as not necessary to serve the one or more UEs, the beamforming weight being sent in a digital domain via a Control plane (C-plane). The method may in addition include disabling the MIMO antenna elements assigned the beamforming weight of zero. Other embodiments of this aspect include corresponding computer systems, apparatus, and computer programs recorded on one or more computer storage devices, each configured to perform the actions of the methods.

Implementations may include one or more of the following features. The method where the MIMO antenna elements correspond to a single antenna or multiple antennas of the MIMO antenna panel. The method where disabling the MIMO antenna elements includes disabling one or more power amplifiers (PAs) corresponding to the disabled antenna elements. The method where enabling or the disabling of the MIMO antenna elements is performed on a scalable Transmission Time Interval (TTI) unit. The method where a Next Generation Node B (gNB) determines the number of MIMO antenna elements of the MIMO antenna panel required to serve the one or more UEs. The method where the gNB determines the number of MIMO antenna elements of the MIMO antenna panel required to serve the one or more UEs based on a location of the one or more UEs. The method may include learning areas where a plurality of UEs are concentrated and dynamically determining areas where the O-RAN should have more coverage and areas where the O-RAN should have less coverage. The method may include implementing Artificial Intelligence algorithms for learning the areas where the plurality of UEs are concentrated and dynamically determining areas where the O-RAN should have more coverage and areas where the O-RAN should have less coverage. The method may include reconfiguring the O-RAN dynamically according to determined coverage areas. Implementations of the described techniques may include hardware, a method or process, or a computer tangible medium.

In another general aspect, a wireless communication system is provided. The wireless communication system may include a plurality of User Equipment (UEs) and may also include a Next Generation Node B (gNB) configured to: determine a number of Multiple-Input-Multiple-Output (MIMO) antenna elements of a MIMO antenna panel required to serve at least one of the plurality of UEs; and identify a number of MIMO antenna elements of the MIMO antenna panel not necessary to serve the at least one of the plurality of UEs. The wireless communication may furthermore include an Open Radio Network (O-RAN) Central Unit (O-CU) connected to the gNB, an O-RAN Distributed Unit (O-DU) connected to the O-CU and an O-RAN Radio Unit (O-RU), where the O-DU is configured to send to the O-RU a beamforming weight of zero assigned to the MIMO antenna elements identified as not necessary to serve the at least one of the plurality of UEs, the beamforming weight being sent in a digital domain via a Control plane (C-plane), and where the O-RU is configured to disable the MIMO antenna elements assigned the beamforming weight of zero. Other embodiments of this aspect include corresponding computer systems, apparatus, and computer programs recorded on one or more computer storage devices, each configured to perform the actions of the methods.

Implementations may include one or more of the following features. The wireless communication system where the MIMO antenna elements correspond to a single antenna, or multiple antennas of the MIMO antenna panel. The wireless communication system where the O-RU disabling the MIMO antenna elements includes disabling one or more power amplifiers (PAs) corresponding to the disabled antenna elements. The wireless communication system where the O-RU is configured to enable or the disable the MIMO antenna elements on a scalable Transmission Time Interval (TTI) unit. The wireless communication system where the gNB determines the number of MIMO antenna elements of the MIMO antenna panel required to serve one or more UEs based on a location of the one or more UE. Wireless communication system where the gNB is configured to learn areas where the plurality of UEs are concentrated and dynamically determine areas where wireless communication system should have more coverage and areas where the O-RAN should have less coverage. The wireless communication system where the gNB is configured to communicate with an Artificial Intelligence (AI) platform, where machine learning or deep learning techniques implemented in the AI platform learn the areas where the plurality of UEs are concentrated and dynamically determine areas where the wireless communication system should have more coverage and areas where the O-RAN should have less coverage. The wireless communication system where the gNB is further configured to dynamically reconfigure the coverage area. The wireless communication system may include a plurality of gNBs and corresponding O-CU, O-DU, and O-RU.

In another general aspect, a non-transitory computer-readable medium having stored thereon instructions for causing processing circuitry to execute a process is provided. The process may include determining a number of Multiple-Input-Multiple-Output (MIMO) antenna elements of a MIMO antenna panel required to serve one or more User Equipment (UEs). The process may also include identifying a number of Multiple-Input-Multiple-Output (MIMO) antenna elements of the MIMO antenna panel not essential to serve the one or more UEs. The process may furthermore include sending, from an Open Radio Network (O-RAN) Distributed Unit (O-DU) to a O-RAN Radio Unit (O-RU), a beamforming weight of zero assigned to the MIMO antenna elements identified as not essential to serve the one or more UE, the beamforming weight being sent in a digital domain via a Control plane (C-plane). The process may include disabling the MIMO antenna elements assigned the beamforming weight of zero.

DETAILED DESCRIPTION

Figure 1:
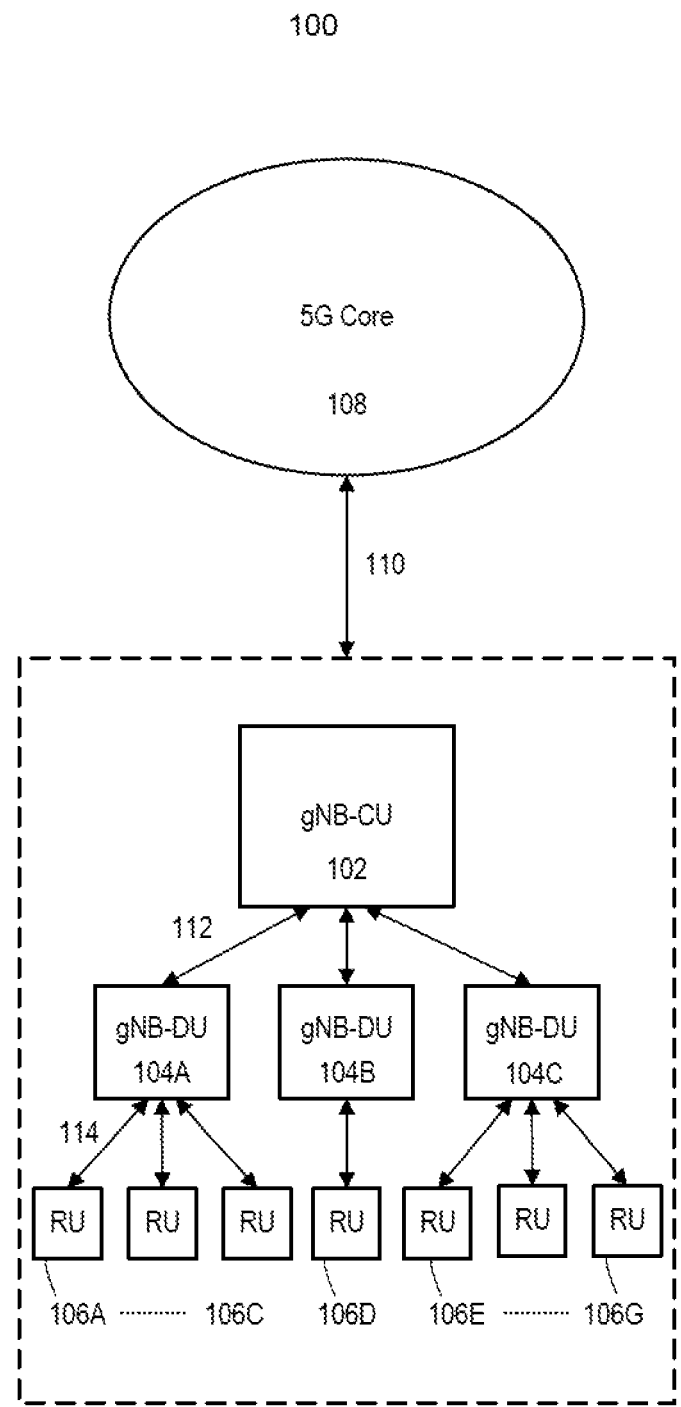
FIG. 1 is a block diagram illustrating RAN functions.

FIG. 1 is a block diagram illustrating disaggregated RAN functions. In a 5G network, O-RAN functions are disaggregated into a Centralized Unit (O-CU) 102, one or more Distributed Unit (O-DU) 104A, 104B, and 104C and one or more Radio Unit (O-RU) 1064-106G. The O-RU may be referred to as a Remote Radio Unit (RRU).

The logical functions of a base station, which may be referred to as a gNB, may be split between the O-CU, O-DU, and O-RU. In a cloud based Radio Access Network (CRAN) like O-RAN, a significant portion of the RAN layer processing is performed at the O-CU, which may be referred to as the Baseband Unit (BBU). The O-CU and O-DU functions may be run as virtual software functions on commercial off-the-shelf (COTS) hardware.

The O-CU 102 is a logical node that includes gNB functions such as the transfer of user data, mobility control, radio access network sharing, positioning, session management and the like, except for those functions allocated exclusively to the O-DU. The O-CU 102 may be co-located with a O-DU 104 or hosted on servers that reside in a regional cloud data center. Thus, it should be appreciated that the diagram in FIG. 1 does not represent any physical relationship between the O-CU 102, O-DUs 104A-104C, and O-RUs 106A-106G. The O-CU 102 may be coupled with 5G core network 108 via backhaul 110. O-CU 102 communicates with the one or more O-DUs 104A-104C through mid-haul link 112.

The O-DU 104 is a logical node that includes a subset of the gNB functions. Depending on the functional split, the O-DU 104 may be considered to be part of the O-CU/BBU. The RF real-time critical functions may be processed in the O—O-RU 106 and the O-DU 104. As illustrated in FIG. 1, O-CU 102 may be coupled to one or more O-DUs. O-DUs 104A, 104B, and 104C are illustrated as an example. It should be understood that O-CU 102 may be coupled with one, two, three, or more O-DUs.

Each O-DU 104A, 104B, and 104C may be coupled to one or more O-RUS through fronthaul (FH) interface 114. FIG. 1 illustrates O-DU 104A coupled with three RUs (106A-106C), O-DU 104B coupled with one O-RU 106D, and O-DU 104C coupled with three DUs (106E-106F). One skilled in the art will appreciate that any number of one or more O-RUs may be coupled with a single O-DU.

The O-RU is the radio hardware that coverts radio signals sent to and from the antenna into a digital signal for transmission over packet networks. The O-RU 106 handles the digital front end (DFE) and the lower PHY layer, as well as the digital beamforming (BF) functionality. Key considerations of O-RU design are the size, weight, and power consumption.

For O-RU 106A and O-DU 104A to communicate, FH interface 114 is provided. The 3rd Generation Partnership Project (3GPP) has defined 8 options for the split between the BBU and the O-RU among different layers of the protocol stack. One of the splits recently standardized by O-RAN Alliance is split option 7-2*x* (Intra-Physical (PHY) layer split). Option 7-2*x* includes asymmetrical options which allow obtaining benefits of different sub-options for UL and DL independently. Split Option 7-2*x* implements resource element mapping and higher functions in the O-DU and digital BF and lower functions in the O-RU.

Figure 2:
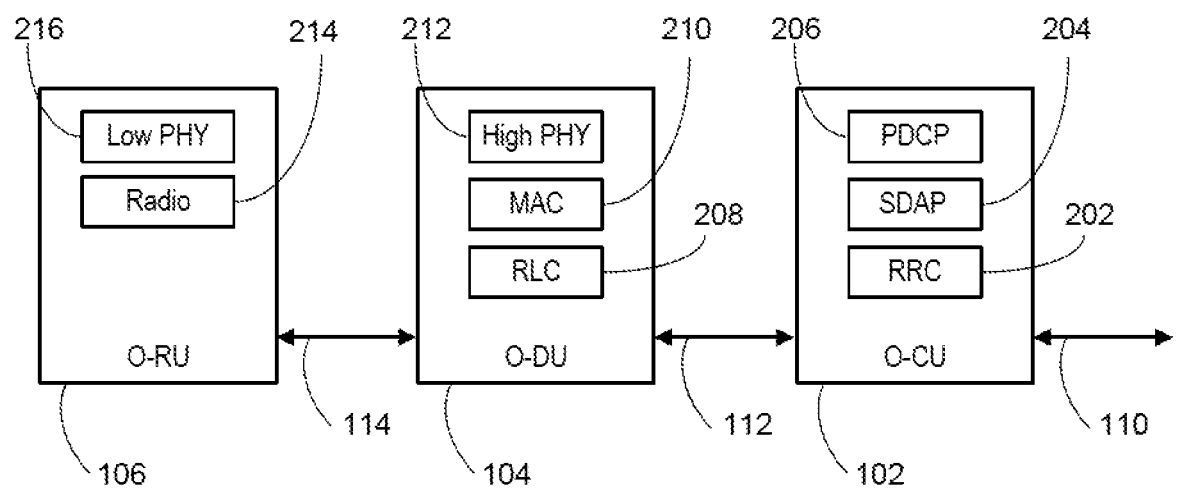
FIG. 2 is a block diagram illustrating a split option 7.2x.

FIG. 2 illustrates a block diagram of a split option 7-2*x*. O-CU 102 is a logical node for hosting Radio Resource Control (RRC) 202, Service Data Adaption Protocol (SDAP) 204, and/or Packet Data Convergence Protocol (PDCP) 206 sublayers of the RAN.

O-DU 104 is a logical node hosting Radio Link Control (RLC) 208, Media Access Control (MAC) 210, and high physical sublayers (High PHY 212) of the RAN. O-RU 106 is a physical node hosting radio 214 that converts radio signals transmitted/received to digital signals. host radio that are transmitted/received over FH interface 114 to the O-DU 104. O-RU 106 may host low physical sublayers (Low PHY 216). Thus, in split option 7.2*x*, O-DU 104 handles the RLC 208, MAC 210 and higher PHY 212 functions, and the O-RU 106 handles the lower PHY 216 and RF 214 functions.

In some embodiments O-CU 102 and O-DU 104 may share some functions. O-CU 102 functionality may be embedded with the O-DU 106 on the same server, or it can be pushed up the network as a virtualized aggregation entity, along with an O-RAN Controller or aggregator. That is, DU 104 may handle RRC/PDCP/RLC/MAC and higher PHY functions.

FH interface 114 may be an enhanced Common Public Radio Interface (eCPRI). O-CU 102 communicates with the one or more O-DUs 104A-104C through mid-haul link 112.

Split option 7-2*x* has several advantages such as simplicity, transport bandwidth scalability, beamforming support, interoperability, support for advanced receivers and inter-cell coordination, lower O-RAN RU (O-RU) complexity, future proofing, interface and functions symmetry.

Although split option 7-2*x* has relatively low fronthaul throughput compared to split options 7-1 or split option 8 (PHY-RF split), it is always beneficial to reduce the FH throughput rate as this will have a direct impact on scalability, the transport medium, and the Ethernet cards at the O-RAN-compliant DU (O-DU 104) and ORAN-compliant RU (O-RU 106).

There are four planes specified in the O-RAN standards, namely the user-plane (U-plane), control plane (C-plane), synchronization plane (S-plane), and management plane (M-plane). The U-plane handles messages for efficient data transfer within the strict 5G time limits. The C-plane handles control plane messages used to define the scheduling, coordination required for data transfer, beamforming etc. The S-plane is responsible for the timing and synchronization between the O-DU and O-RU. M-Plane messages are used to manage the radio unit. The M-Plane provides a variety of O-RU management functions to set parameters on the O-RU side as required by the C/U-Plane and S-Plane.

A central purpose of the C-plane messages is to transmit data-associated control information required for processing of user data (e.g., scheduling and beamforming commands). These messages are sent separately for downlink (DL) related commands and (UL) related commands. C-plane messages are sent to the RU 106 via FH 114. A C-plane message may include a control command to send beamforming weights to the RU 106.

As indicated above, the PA consumes most of the power in the O-RU 106. Disabling the PA may significantly reduce the power consumed by the O-RU 106. The O-RU 106 may be directed to turn off one or more antennas in a MIMO antenna panel by O-DU 104 sending a beamforming weight of zero assigned to one or more antenna elements of the MIMO antenna panel. Thus, power consumption in the O-RU 106 may be reduced by deactivating antenna elements that are not currently needed to serve UEs.

Figure 3:
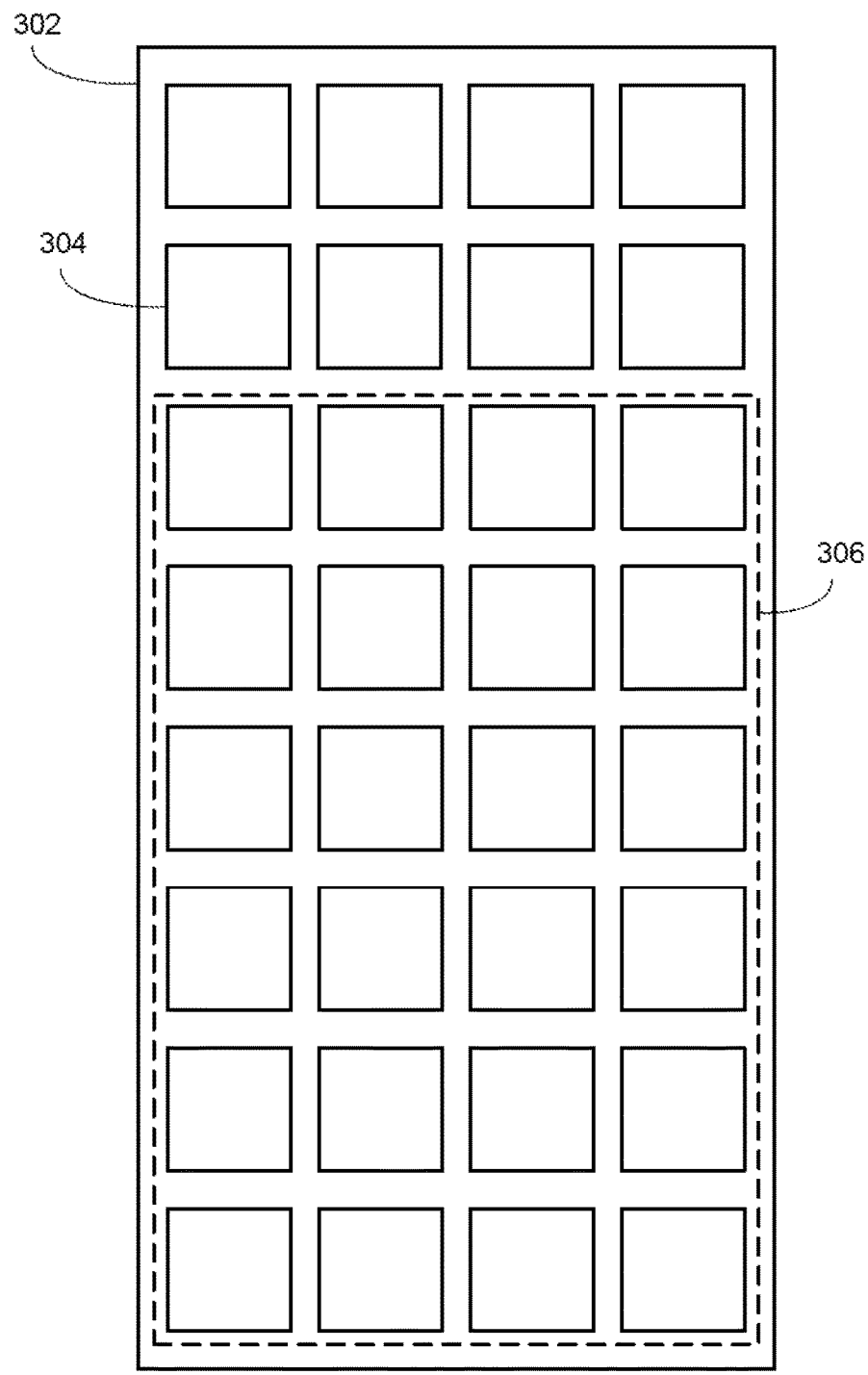
FIG. 3 illustrates a MIMO antenna panel according to an example embodiment.

FIG. 3 shows a MIMO antenna panel according to some embodiments. Antenna panel 302 includes thirty two (32) antenna elements 304. The skilled artisan should understand that FIG. 3 is an illustration that is simplified for ease of description. While not shown in FIG. 3, it should be understood that each antenna element may corresponds to a dual polarized antenna with each polarization fed by the radio transmit and receive chains. Dual polarization antennas consist of two orthogonal polarizations. This is defined as polarizations that are 90 degrees apart. Horizontal and Vertical (Linear Polarization) or +45/−45 (Slant Polarization) are examples of orthogonal polarizations.

FIG. 3 illustrates an example where 24 antenna elements 304 identified by the dashed line 306 are assigned a beamforming weight of zero. An O-DU, such as O-DU 104 transmits the C-plane messages to an O-RU (O-RU 106) carrying the beamforming weigh. The O-RU disables the antenna elements assigned a beamforming weight of zero. Disabling the MIMO antenna elements includes disabling one or more power amplifiers (PAs) corresponding to the disabled antenna elements.

Depending on the radio capability, antenna elements may be activated or deactivated on a scalable Transmission Time Interval (TTI) unit. A gNB/CU may determine the number of antenna elements required to serve one or more UEs. This may be based on the current location of the one or more UEs.

The O-RAN and/or a gNB/CU may be configured to learn areas where a plurality of UEs are concentrated and dynamically determining areas where the O-RAN should have more coverage and areas where the O-RAN should have less coverage. Artificial Intelligence algorithms may be implemented for learning the areas where the plurality of UEs are concentrated and dynamically determining areas where the O-RAN should have more coverage and areas where the O-RAN should have less coverage. Thus, the O-RAN may be dynamically reconfigured according to determined coverage areas.

Figure 4:
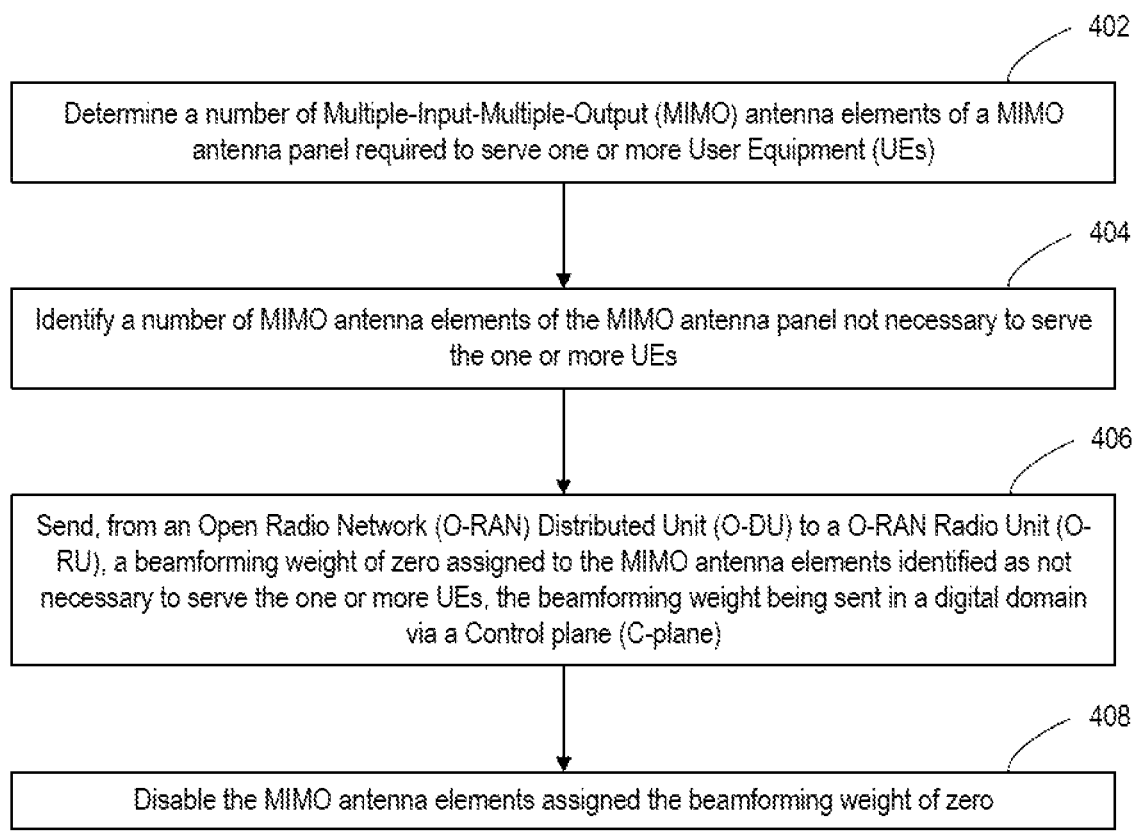
FIG. 4 is a flowchart of an example process according to an embodiment.

FIG. 4 is a flowchart of an example power saving process. In some implementations, one or more process blocks of FIG. 4 may be performed by a single device. As shown in FIG. 4, process 400 at 402 may include determining a number of Multiple-Input-Multiple-Output (MIMO) antenna elements of a MIMO antenna panel required to serve one or more User Equipment (UEs). For example, an O-CU may determine a number of MIMO antenna elements of a MIMO antenna panel required to serve one or more UEs. Also shown in FIG. 4, process 400 at 404 may include identifying a number of MIMO antenna elements of the MIMO antenna panel not necessary to serve the one or more UEs. For example, an O-CU may identify a number of MIMO antenna elements of the MIMO antenna panel not necessary to serve the one or more UEs. As further shown in FIG. 4, process 400 at 406 may include sending, from an Open Radio Network (O-RAN) Distributed Unit (O-DU) to a O-RAN Radio Unit (O-RU), a beamforming weight of zero assigned to the MIMO antenna elements identified as not necessary to serve the one or more UEs, the beamforming weight being sent in a digital domain via a Control plane (C-plane). For example, device may send, from O-RAN distributed unit O-DU to an O-RAN RU, a beamforming weight of zero assigned to the MIMO antenna elements identified as not necessary to serve the one or more UEs, the beamforming weight being sent in a digital domain via a control plane (c-plane), as described above. Process 400 at 408 may include disabling the MIMO antenna elements assigned the beamforming weight of zero. For example, The O-RU may disable the MIMO antenna elements assigned the beamforming weight of zero.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
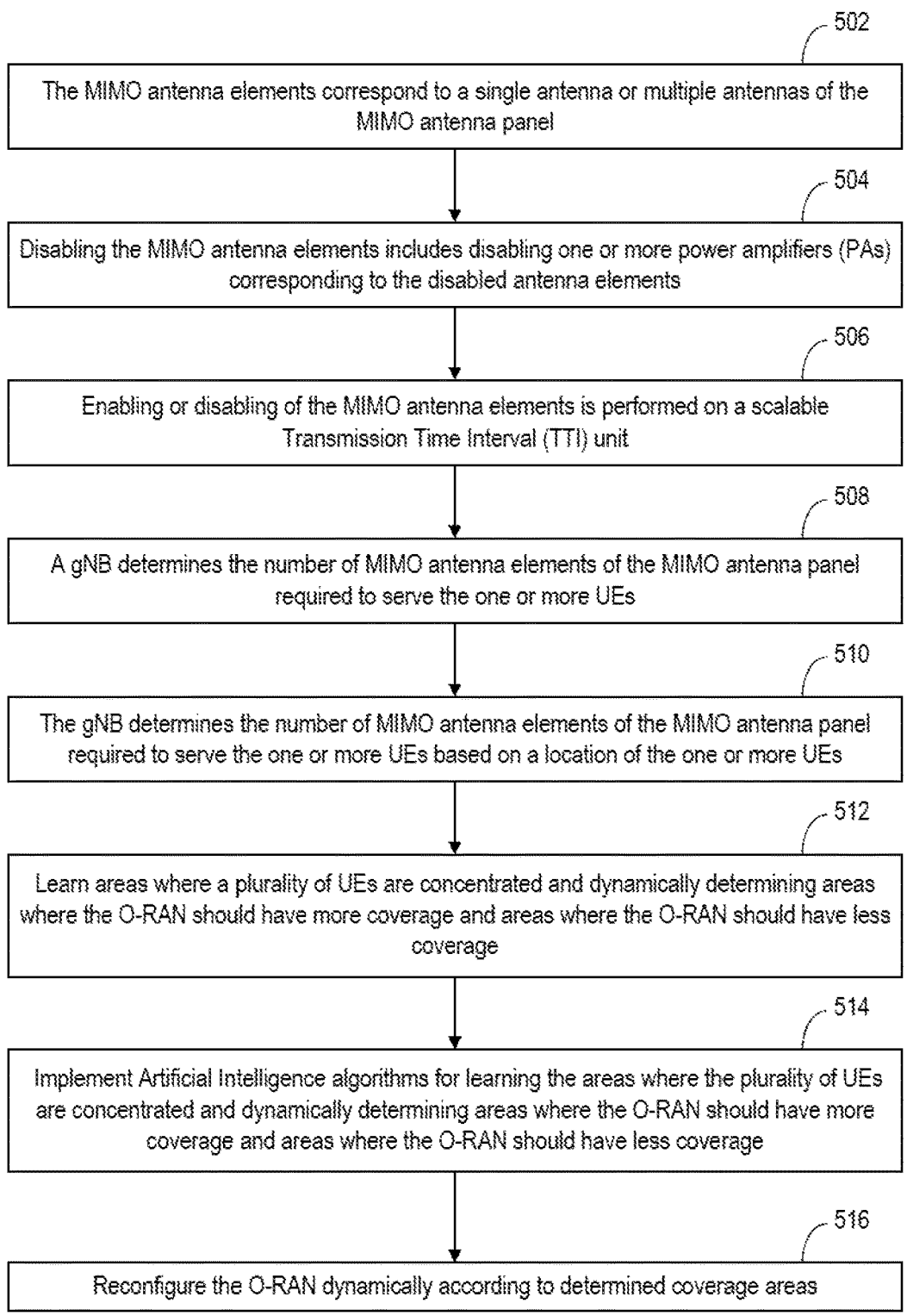
FIG. 5 is a flowchart of additional implementations of a power saving process according to example embodiments.

FIG. 5 a flowchart of additional implementations of a power saving process in example embodiments. In some implementations, one or more process blocks of FIG. 5 may be performed by a single device.

Process 500 may include additional implementations, such as any single implementation or any combination of implementations described below and/or in connection with one or more other processes described elsewhere herein. In a first implementation, at 502 the MIMO antenna elements correspond to a single antenna or multiple antennas of the MIMO antenna panel.

In a second implementation, alone or in combination with the first implementation, at 504 disabling the MIMO antenna elements may include disabling one or more power amplifiers (PAs) corresponding to the disabled antenna elements.

In a third implementation, alone or in combination with the first and second implementation, at 506 enabling or disabling of the MIMO antenna elements is performed on a scalable Transmission Time Interval (TTI) unit.

In a fourth implementation, alone or in combination with one or more of the first through third implementations, at 508 a Next Generation Node B (gNB) determines the number of MIMO antenna elements of the MIMO antenna panel required to serve the one or more UEs.

In a fifth implementation, alone or in combination with one or more of the first through fourth implementations, at 510 the gNB determines the number of MIMO antenna elements of the MIMO antenna panel required to serve the one or more UEs based on a location of the one or more UEs.

A sixth implementation, alone or in combination with one or more of the first through fifth implementations, at 512 process 500 may include learning areas where a plurality of UEs are concentrated and dynamically determining areas where the O-RAN should have more coverage and areas where the O-RAN should have less coverage.

A seventh implementation, alone or in combination with one or more of the first through sixth implementations, at 514 process 500 may include implementing Artificial Intelligence algorithms for learning the areas where the plurality of UEs are concentrated and dynamically determining areas where the O-RAN should have more coverage and areas where the O-RAN should have less coverage.

An eighth implementation, alone or in combination with one or more of the first through seventh implementations, at 516 process 500 may include reconfiguring the O-RAN dynamically according to determined coverage areas.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Other variations to the disclosed embodiments can be understood and effected by those skilled in the art in practicing the recited features, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to an advantage.

Operations like acquiring, accessing, analyzing, capturing, comparing, determining, inputting, obtaining, outputting, providing, store or storing, calculating, simulating, receiving, warning, and stopping can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A method of controlling one or more a sub-arrays of antenna elements, the method comprising:
   determining a number of Multiple-Input-Multiple-Output (MIMO) antenna elements of a MIMO antenna panel required to serve one or more User Equipment (UEs);
   identifying a number of MIMO antenna elements of the MIMO antenna panel not necessary to serve the one or more UEs;
   sending, from an Open Radio Network (O-RAN) Distributed Unit (O-DU) to a O-RAN Radio Unit (O-RU), a beamforming weight of zero assigned to the MIMO antenna elements identified as not necessary to serve the one or more UEs, the beamforming weight being sent in a digital domain via a Control plane (C-plane); and
   disabling the MIMO antenna elements assigned the beamforming weight of zero.

2. The method according to claim 1, wherein the MIMO antenna elements correspond to a single antenna or multiple antennas of the MIMO antenna panel.

3. The method according to claim 2, wherein disabling the MIMO antenna elements includes disabling one or more power amplifiers (PAs) corresponding to the disabled antenna elements.

4. The method according to claim 1, wherein enabling or the disabling of the MIMO antenna elements is performed on a scalable Transmission Time Interval (TTI) unit.

5. The method according to claim 1, wherein a Next Generation Node B (gNB) determines the number of MIMO antenna elements of the MIMO antenna panel required to serve the one or more UEs.

6. The method according to claim 5, wherein the gNB determines the number of MIMO antenna elements of the MIMO antenna panel required to serve the one or more UEs based on a location of the one or more UEs.

7. The method according to claim 6, further comprising learning areas where a plurality of UEs are concentrated and dynamically determining areas where the O-RAN should have more coverage and areas where the O-RAN should have less coverage.

8. The method according to claim 7, further comprising implementing Artificial Intelligence algorithms for learning the areas where the plurality of UEs are concentrated and dynamically determining areas where the O-RAN should have more coverage and areas where the O-RAN should have less coverage.

9. The method according to claim 8, further comprising reconfiguring the O-RAN dynamically according to determined coverage areas.

10. A wireless communication system comprising:
a plurality of User Equipment (UEs)
a Next Generation Node B (gNB) configured to:
determine a number of Multiple-Input-Multiple-Output (MIMO) antenna elements of a MIMO antenna panel required to serve at least one of the plurality of UEs; and
identify a number of MIMO antenna elements of the MIMO antenna panel not necessary to serve the at least one of the plurality of UEs;
an Open Radio Network (O-RAN) Central Unit (O-CU) connected to the gNB and;
an O-RAN Distributed Unit (O-DU) connected to the O-CU; and
an O-RAN Radio Unit (O-RU), wherein the O-DU is configured to send to the O-RU a beamforming weight of zero assigned to the MIMO antenna elements identified as not necessary to serve the at least one of the plurality of UEs, the beamforming weight being sent in a digital domain via a Control plane (C-plane), and wherein the O-RU is configured to disable the MIMO antenna elements assigned the beamforming weight of zero.

11. The wireless communication system according to claim 10, wherein the MIMO antenna elements correspond to a single antenna, or multiple antennas of the MIMO antenna panel.

12. The wireless communication system according to claim 11, wherein the O-RU disabling the MIMO antenna elements includes disabling one or more power amplifiers (PAS) corresponding to the disabled antenna elements.

13. The wireless communication system according to claim 10, wherein the O-RU is configured to enable or the disable the MIMO antenna elements on a scalable Transmission Time Interval (TTI) unit.

14. The wireless communication system according to claim 10, wherein the gNB determines the number of MIMO antenna elements of the MIMO antenna panel required to serve one or more UEs based on a location of the one or more UEs.

15. The wireless communication system according to claim 14, wherein the gNB is configured to learn areas where the plurality of UEs are concentrated and dynamically determine areas where wireless communication system should have more coverage and areas where the O-RAN should have less coverage.

16. The wireless communication system according to claim 15, wherein the gNB is configured to communicate with an Artificial Intelligence (AI) platform, wherein machine learning or deep learning techniques implemented in the AI platform learn the areas where the plurality of UEs are concentrated and dynamically determine areas where the wireless communication system should have more coverage and areas where the O-RAN should have less coverage.

17. The wireless communication system according to claim 16, wherein the gNB is further configured to dynamically reconfigure the coverage area.

18. The wireless communication system according to claim 17, further comprising a plurality of gNBs and corresponding O-CU, O-DU, and O-RU.

19. A non-transitory computer-readable medium having stored thereon instructions for causing processing circuitry to execute a process, the process comprising:
determining a number of Multiple-Input-Multiple-Output (MIMO) antenna elements of a MIMO antenna panel required to serve one or more User Equipment (UEs);
identifying a number of Multiple-Input-Multiple-Output (MIMO) antenna elements of the MIMO antenna panel not essential to serve the one or more UEs;
sending, from an Open Radio Network (O-RAN) Distributed Unit (O-DU) to a O-RAN Radio Unit (O-RU), a beamforming weight of zero assigned to the MIMO antenna elements identified as not essential to serve the one or more UEs, the beamforming weight being sent in a digital domain via a Control plane (C-plane); and
disabling the MIMO antenna elements assigned the beamforming weight of zero.

* * * * *